United States Patent [19]
Morrell

[11] Patent Number: 5,934,912
[45] Date of Patent: Aug. 10, 1999

[54] TECHNIQUE FOR EFFECTIVELY DISTRIBUTING COMMUNICATION CONNECTIONS

[75] Inventor: Edward Albert Morrell, Randolph Township, Morris County, N.J.

[73] Assignee: Lucent Technologies Inc., Murray Hill, N.J.

[21] Appl. No.: 08/988,348

[22] Filed: Dec. 10, 1997

[51] Int. Cl.[6] .................................................. H01R 29/00
[52] U.S. Cl. ........................ 439/49; 439/404; 379/327; 379/330
[58] Field of Search ..................... 439/49, 404; 379/325, 379/326, 327, 328, 321, 330

[56] References Cited

U.S. PATENT DOCUMENTS

| | | | |
|---|---|---|---|
| 3,611,264 | 10/1971 | Ellis, Jr. ................................. | 439/404 |
| 3,919,495 | 11/1975 | Berglund et al. ....................... | 379/325 |
| 4,160,880 | 7/1979 | Brey ...................................... | 439/571 |
| 4,213,013 | 7/1980 | Perna et al. ............................. | 439/49 |

*Primary Examiner*—Steven L. Stephan
*Assistant Examiner*—Hae Moon Hyeon

[57] ABSTRACT

In a terminal connected to a distribution cable composed of wire pairs corresponding to communication lines, the wire pairs are disposed in an array across index strips. Termination of a selected wire pair corresponding to a communication line is achieved by mounting an insulation displacement connection (IDC) connector on one of the index strips. In the mounting process, the connector makes electrical contact with the selected wire pair. Drop wires may then be connected to the IDC connector, and brought into customer premises to realize the communication line. Unterminated wire pairs are available for termination at another terminal. Advantageously, using one or more terminals to distribute the wire pairs in accordance with the invention obviates, among others, the need for a prior art feeder distribution interface used in the traditional wire pair distribution.

20 Claims, 2 Drawing Sheets

TECHNIQUE FOR EFFECTIVELY DISTRIBUTING COMMUNICATION CONNECTIONS

FIELD OF THE INVENTION

The invention relates to communication connection arrangements, and more particularly to an arrangement for distributing communication connections which are bundled in a group.

BACKGROUND OF THE INVENTION

Typically, the communication facility connecting telephone equipment to a public switched telephone network (PSTN) comprises a twisted pair of copper wires, and is referred to as a "customer line." The customer line provides a two-way communication path between the telephone equipment and a central office serving as a gateway to the PSTN.

To realize customer lines, a feeder cable extends from the central office to a feeder distribution interface, from which a distribution cable runs. The feeder cable and distribution cable are each composed of many plastic-insulated copper wires twisted together into pairs. The number of wire pairs in either cable is typically on the order of 1,000. The wire pairs in the feeder cable, known as "feeder pairs," each of which corresponds to a telephone number, are terminated on one side of the feeder distribution interface. The wire pairs in the distribution cable, known as "distribution pairs," each of which corresponds to a customer line, extend from the other side of the interface. The assignment of a telephone number to a particular customer line is accomplished by connecting, at the feeder distribution interface, the feeder pair corresponding to the telephone number with the distribution pair corresponding to the particular customer line.

To deliver customer lines to customer premises, e.g., a cluster of homes, the distribution cable containing the distribution pairs may be aerially suspended by and strung through telephone poles, or buried underground. Aerial terminals are used to terminate the distribution pairs from above ground while pedestal terminals which are the ground versions of the aerial terminals are used to terminate the distribution pairs from underground. These aerial terminals or pedestal terminals are placed close to the cluster of homes.

In prior art, each aerial or pedestal terminal is used to terminate a predetermined number of distribution pairs, which includes a splice chamber, and a terminal block having the predetermined number of pairs of metal posts thereon, where the predetermined number is typically 12. Accordingly, the splice chamber in the terminal is used to splice 12 distribution pairs from the distribution cable. Each resulting pair of splice connections corresponding to a distribution pair is terminated at first ends of a respective pair of metal posts on the terminal block. Drop wires may be extended from the other ends of the metal post pair to one of the homes for connection with telephone equipment. Thus, currently, each aerial or pedestal terminal typically provides 12 customer lines which are shared by four homes, i.e., three lines per home.

SUMMARY OF THE INVENTION

New network architectures have been developed to provide customer premises with broadband lines having high bandwidth for video and/or data communications, and Internet access, in addition to the traditional telephone lines. One such architecture is known as a "switched digital broadband (SDB)" architecture. In accordance with this architecture, an optical network unit connected to a central office is placed in an area that would serve, e.g., 24–36 homes. Each distribution cable extending from the optical network unit is composed of, e.g., 50–100 wire pairs comprising the broadband lines and traditional telephone lines to be shared by four homes.

I have recognized that the prior art aerial or pedestal terminal for terminating typically 12 wire pairs described above is no longer applicable in a network based on the SDB architecture, which requires an aerial or pedestal terminal capable of terminating all 50–100 wire pairs in the distribution cable. In addition, an expanded version of the prior art aerial or pedestal terminal for terminating 50–100 wire pairs which includes a splice chamber and terminal block is not deemed cost-effective. I have also recognized that the above-described feeder distribution interface for assigning telephone numbers to thousands of distribution pairs extending from the interface not only is inapplicable in the SDB network, but also unnecessary.

In an aerial or pedestal terminal in accordance with the invention which may be used in the SDB network, the wire pairs in the distribution cable extending from the optical network unit, each associated with a telephone number, are disposed in an array across at least one strip. A connector may be attached onto the strip to make connection with any one of the wire pairs and terminate same. Because of the relatively simple design of the inventive aerial or pedestal terminal where a connector is used to efficiently splice and terminate a wire pair at the same time, the inventive aerial or pedestal terminal is relatively inexpensive, with respect to the prior art terminal. In addition, by terminating the wire pair using the connector, the resulting customer line is conveniently assigned the telephone number associated with the wire pair, thereby obviating use of the prior art feeder distribution interface to assign telephone numbers. Moreover, with the invention, each wire pair in the distribution cable is conveniently available for termination at the inventive aerial or pedestal terminal.

DETAILED DESCRIPTION

In this information age, people demand more and more transmission bandwidth for communicating information. For example, many homes nowadays have individual telephone lines for facsimile and modem transmissions, in addition to voice communications. It is anticipated that in the near future, many homes will also require broadband lines providing relatively high bandwidth for video and multimedia applications. To respond to such needs, a new network architecture known as a "switched digital broadband (SDB)" architecture has been developed.

Figure 1:
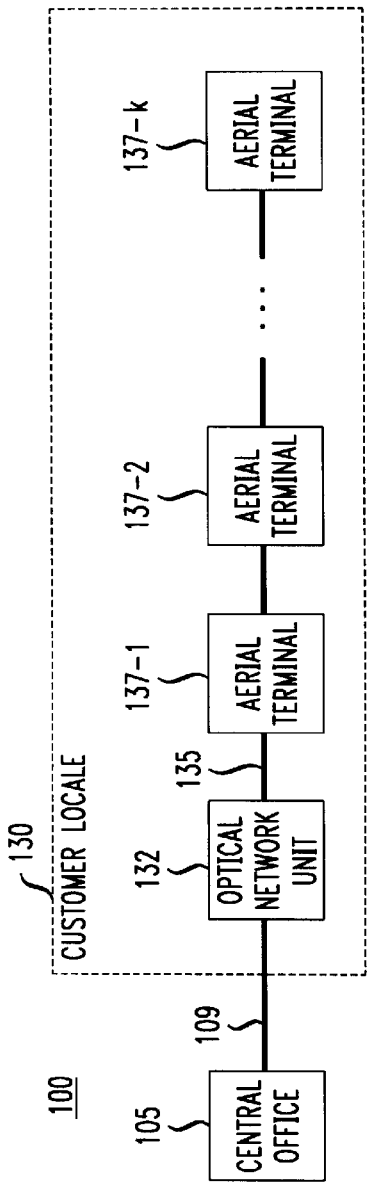
FIG. 1 illustrates a communications arrangement in accordance with the invention.

FIG. 1 illustrates communications arrangement 100 embodying the principles of the invention in accordance with the SDB architecture. In FIG. 1, central office (CO) 105 serving as a gateway to a public switched telephone network (PSTN) provides a high band communications capacity to customer locale 130. To that end, optical fiber 109 is used to transport information at a standard OC-3 rate between CO 105 and optical network unit 132 in locale 130. Unit 132 is used to couple optical fiber 109 to distribution cable 135. The latter is composed of plastic-insulated copper wires twisted together into pairs. In this instance, cable 135 is composed of 80 wire pairs corresponding to 48 traditional telephone lines, and 32 broadband lines for video and multimedia applications. Each wire pair is associated with a telephone number.

In a well known manner, unit 132 converts optical signals representing information in optical fiber 109 to electrical signals representing same to selected wire pairs in distribution cable 135, and vice versa, to realize voice, data, and/or video communications via CO 105. Cable 135 extends to, for example, one or more aerial terminals 137-1 through 137-k in accordance with the invention, where k<1.

Figure 2:
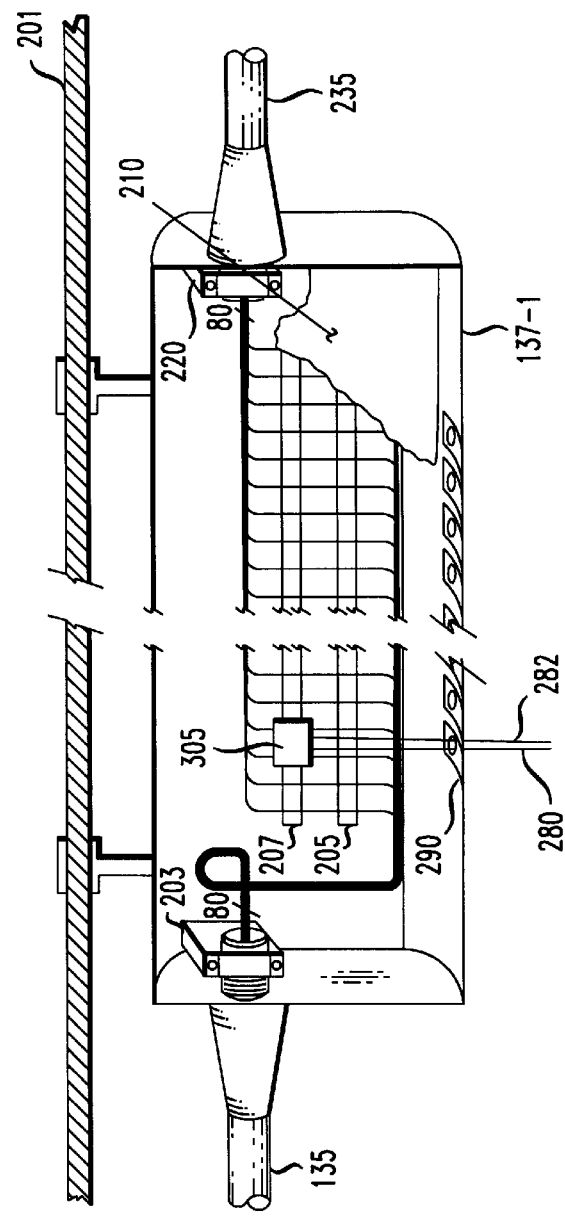
FIG. 2 illustrates an aerial terminal in the communications arrangement of FIG. 1.

Aerial terminals 137-1 through 137-k are similarly arranged for distribution of the 80 wire pairs in cable 135. Without loss of generality, FIG. 2 shows an aerial terminal, say, terminal 137-1 which is connected to cable 135. As shown in FIG. 2, terminal 137-1 is aerially hung from steel cable 201 which is typically provided along telephone poles (not shown) for securing distribution cable 135 along same. Preferably, the housing of terminal 137-1 is covered by insulation material 210 of the type similar to that of material covering cable 135.

Cable 135 typically has a conducting mesh (not shown) enclosing the wire pairs therein, thereby shielding them from any undesirable electromagnetic interference and lightning hits. In connecting to aerial terminal 137-1, the conducting mesh in cable 135 is grounded at grounding block 203 in terminal 137-1. The aforementioned 80 twisted wire pairs in cable 135 enter terminal 137-1 through block 203. The individual wires in each pair are designated an identical index number using color code on the wire insulation to facilitate identification of the pair. For example, the index number runs from "1" to "80" for the different 80 wire pairs. The wire pairs thus identified are then configured in an array, running across index strips 205 and 207 described below. The latter are fixedly attached to the housing of terminal 137-1.

The wire pairs coming from strips 205 and 207 are re-assembled before exiting terminal 137-1 through grounding block 220, and form the core of extension cable 235 extending from terminal 137-1. Like cable 135, cable 235 has a conducting mesh grounded at grounding block 220. Extension cable 235 connects aerial terminal 137-1 to the next aerial terminal, i.e., terminal 137-2 in this case, which may in turn be connected to the terminal next thereto, i.e., terminal 137-3, by another extension cable, and so on and so forth.

Figure 3:
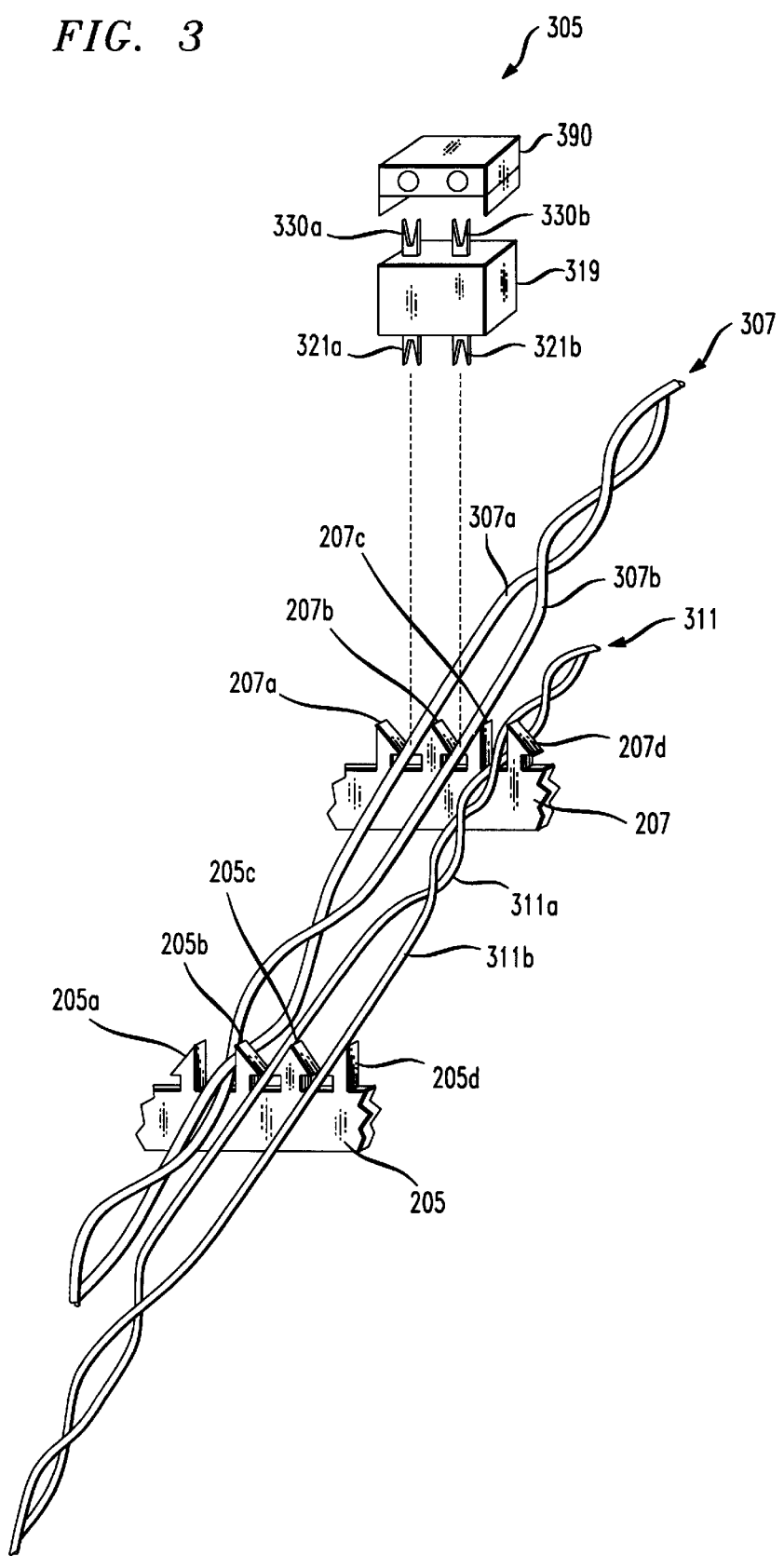
FIG. 3 illustrates disposition of wire pairs in the aerial terminal of FIG. 2 and a connector used to terminate a selected wire pair.

FIG. 3 illustrates the detailed configuration of wire pairs from cable 135 with respect to index strips 205 and 207 in terminal 137-1. Also illustrated in FIG. 3 is insulation displacement connection (IDC) connector 305 used to terminate a selected wire pair.

As shown in FIG. 3, index strips 205 and 207 are disposed parallel to each other. They each have a multiplicity of "half arrow" shaped teeth thereon, interleaved with "full arrow" shaped teeth. For example, strip 205 includes "half arrow" shaped teeth 205a, 205b and 205d, and a "full arrow" shaped tooth 205c. Strip 207 includes "half arrow" shaped teeth 207a, 207c and 207d, and a "full arrow" shaped tooth 207b.

Each "full arrow" shaped tooth on strip 205 is offset to that on strip 207. Accordingly, slots are formed between the teeth on each of strips 205 and 207. Each pair of slots separated by a "full arrow" shaped tooth on strip 205 or 207 are indexed by an index number. In this instance, the index number also runs from "1" to "80" for different slot pairs on strips 205 and 207.

Each wire pair in terminal 137-1 is untwisted around a "full arrow" shaped tooth to dispose its individual wires onto the slot pair on strip 205 or 207 bearing an index number matching the index number identifying the wire pair. On the other hand, the wire pair remains twisted when running through a slot between two "half arrow" shaped teeth on strip 205 or 207. For example, in this instance, twisted wire pair 307, which runs through the slot between "half arrow" shaped teeth 205a and 205b on strip 205, is untwisted around "full arrow" shaped tooth 207b on strip 207 to dispose its individual wires 307a and 307b onto the pair of slots separated by tooth 207b. Twisted wire pair 311, which runs through the slot between "half arrow" shaped teeth 207c and 207d on strip 207, is untwisted around "full arrow" shaped tooth 205c on strip 205 to dispose its individual wires 311a and 311b onto the pair of slots separated by tooth 205c. The aforementioned offsetting of each "full arrow" shaped tooth on strip 207 to that on strip 205 results in disposing on each strip twisted and untwisted wire pairs in an alternate fashion.

IDC connector 305 may be used to terminate a elected wire pair to realize a customer line. As shown in FIG. 3, connector 305 has plastic housing 319, and metallic pins 321a and 321b extended therefrom. Metallic pins 321a and 321b are connected to metallic pins 330a and 330b, respectively. Each metallic pin has a sharp "U" shaped edge. Housing 319 is adapted to snap onto a "full arrow" shaped tooth on strip 205 or strip 207 between pins 321a and 321b.

To terminate wire pair 307 for example, which consists of wires 307a and 307b disposed between "full arrow" shaped tooth 207b on strip 207, connector 305 is first positioned to straddle tooth 207b, with pins 321a and 321b directed toward wires 307a and 307b, respectively. By pushing connector 305 onto tooth 207b, housing 319 snaps onto same, thereby securing the position of connector 305. At the same time, the "U" shaped edges of pins 321a and 321b cut through the insulation of wires 307a and 307b, respectively, but short of the conductors in the wires, thereby making electrical contact with the wires.

In this instance, two index strips, i.e., strips 205 and 207, are used to reduce the length of terminal 137-1, taking advantage of the alternate twisted and untwisted wire pair arrangement described above. Otherwise, had only one index strip been used, all 80 wire pairs in terminal 137-1 would be laid across the strip untwisted, requiring much more length of the terminal. Accordingly, in this instance, IDC connectors are used to terminate contiguous wire pairs in a staggered fashion. Thus, in the above example where IDC connector 305 is used to terminate wire pair 307 on strip 207, when termination of wire pair 311 is required, another IDC connector would be used to terminate wire pair 311 on strip 205.

Continuing the above example, the termination of wire pair 307 is complete with connection of a pair of drop wires, denoted 280 and 282 in FIG. 2, to respective pins 330a and 330b in connector 305. To that end, cap 390 adapted to snap onto housing 319 is provided for pressing the drop wires against the "U" shaped edges of the respective pins. By so doing, these edges would cut through the insulation of the drop wires to make electrical contact with the wires.

As shown in FIG. 2, multiple openings are provided on terminal 137-1 for egress of drop wires. In this instance, drop wires 280 and 282 exit terminal 137-1 through opening 290. These wires are brought into one of the customer premises and, by virtue of the above termination, are assigned the telephone number associated with wire pair 307. The drop wires may be connected to telephone equipment or multimedia equipment for communications, depending on the capacity afforded by wire pair 307.

Other wire pairs in terminal 137-1 can be similarly terminated. Any unterminated wire pairs are identified by their index numbers, and may be similarly terminated in other aerial terminals (e.g., terminals 137-2 through 137-k) to provide the necessary telephone and/or broadband lines to the customer premises close thereto.

The foregoing merely illustrates the principles of the invention. It will thus be appreciated that a person skilled in the art will be able to devise numerous arrangements which, although not explicitly shown or described herein, embody the principles of the invention and are thus within its spirit and scope.

For example, in the illustrative embodiment, the wire pairs in distribution cable 135 are aerially suspended, and terminated in one or more aerial terminals such as terminal 137-1. It will be appreciated that cable 135 may be buried underground, and the termination of the wire pairs therein may be achieved at one or more pedestal terminals situated on ground, which however are arranged similarly to the aerial terminals in accordance with the invention. Further, it will be appreciated that a combination of the pedestal and aerial terminals may be used to terminate wire pairs from an underground or aerially suspended distribution cable.

In addition, in the disclosed embodiment, strips 205 and 207 are fixedly attached to the housing of terminal 137-1. It will be appreciated that these strips may be attached thereto through such a support as metal brackets or other structures which may fit inside the housing.

Finally, communications arrangement 100 disclosed herein is in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

I claim:

1. Apparatus for distributing a plurality of communication connections comprising:
    a support; and
    at least first and second strips, attached to the support, for disposing at least one of the plurality of communication connections across the first and second strips, each of the first and second strips including a plurality of first slots and a plurality of second slots thereon, at least the first strip being adapted to secure a position of at least one connector mounted thereon for terminating said at least one of the plurality of communication connections, the first strip and the second strip being offset from each other to allow said at least one of the plurality of communication connections to pass through a first subset of the first slots on the first strip and a second subset of the second slots on the second strip.

2. The apparatus of claim 1 wherein the support includes a housing of the apparatus.

3. The apparatus of claim 1 wherein each communication connection comprises a pair of wires.

4. The apparatus of claim 3 wherein at least one of the first and second strips includes indicia thereon for marking locations on the strip where wire pairs in selected communication connections in a twisted form are disposed.

5. The apparatus of claim 1 wherein said at least one of the communication connections includes a pair of untwisted wires with individual wires in the pair respectively passing through a pair of the first slots on one of the first and second strips.

6. The apparatus of claim 1 wherein said at least one communication connection comprises a twisted wire pair which passes through one of the second slots on one of the first and second strips.

7. The apparatus of claim 1 wherein the first and second strips are disposed substantially parallel to one another.

8. A system for distributing a plurality of communication connections comprising:
    a structure for disposing at least one of the plurality of communication connections in an array across at least first and second strips in the structure, each of the first and second strips including a plurality of first slots and a plurality of second slots thereon, the first strip and the second strip being offset from each other to allow said at least one of the plurality of communication connections to pass through a first subset of the first slots on the first strip and a second subset of the second slots on the second strip;
    at least one device on the structure for terminating said at least one of the plurality of communication connections; and
    an outlet for extending the plurality of communication connections from the system.

9. The system of claim 8 comprising an aerial terminal.

10. The system of claim 8 comprising a ground terminal.

11. The system of claim 8 further comprising indicators for identifying the plurality of communication connections.

12. The system of claim 8 wherein said at least one of the plurality of communication connections includes a pair of untwisted wires with individual wires in the pair respectively passing through a pair of the first slots on one of the first and second strips.

13. The system of claim 8 wherein the outlet includes a cable for transporting the plurality of communication connections to a second system similar to the system of claim 8.

14. The system of claim 8 wherein said at least one of the plurality of communication connections comprises a twisted wire pair which passes through one of the second slots on one of the first and second strips.

15. The system of claim 8 wherein the at least one device is receptive to at least one connector for making electrical contact with the at least one of the plurality of communication connections.

16. The system of claim 15 wherein the at least one connector includes a plurality of connectors, the at least one device including a plurality of devices, the connectors being mounted, in an alternate fashion, on the first and second strips using the devices thereon.

17. A method for use in a system for distributing a plurality of communication connections, the system including at least first and second strips each comprising a plurality of first slots and a plurality of second slots thereon, and at least one connector, the method comprising:
    extending at least one of the plurality of communication connections through a first subset of the first slots on the first strip and a second subset of the second slots on the second strip; and attaching the at least one connector onto one of the first and second strips to connect the at least one connector to said at least one of the plurality of communication connections.

18. The method of claim 17 further comprising segregating the plurality of communication connections from one another.

19. The method of claim 17 wherein the first and second strips are disposed substantially parallel to one another, the at least one connector comprises a plurality of connectors, the method also including mounting the connectors on the first and second strips in an alternate fashion.

20. The method of claim 17 further comprising identifying each communication connection unconnected to any connector.

* * * * *